US012237623B2

(12) United States Patent
Maesoba et al.

(10) Patent No.: US 12,237,623 B2
(45) Date of Patent: Feb. 25, 2025

(54) SHIELD CONNECTOR INCLUDING PROJECTION-LIKE BACKLASH ELIMINATING PORTION

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroyoshi Maesoba, Mie (JP); Toshifumi Ichio, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 344 days.

(21) Appl. No.: 17/792,004

(22) PCT Filed: Dec. 25, 2020

(86) PCT No.: PCT/JP2020/048631

§ 371 (c)(1),
(2) Date: Jul. 11, 2022

(87) PCT Pub. No.: WO2021/145194

PCT Pub. Date: Jul. 22, 2021

(65) Prior Publication Data

US 2023/0042748 A1 Feb. 9, 2023

(30) Foreign Application Priority Data

Jan. 15, 2020 (JP) ................................ 2020-004084

(51) Int. Cl.
*H01R 13/6591* (2011.01)
*H01R 4/18* (2006.01)
(Continued)

(52) U.S. Cl.
CPC ......... *H01R 13/65912* (2020.08); *H01R 4/18* (2013.01); *H01R 13/42* (2013.01); *H01R 13/6582* (2013.01); *H01R 13/6592* (2013.01)

(58) Field of Classification Search
CPC .............. H01R 13/65912; H01R 13/42; H01R 13/6582; H01R 13/6592; H01R 13/0518; H01R 4/18
(Continued)

(56) References Cited

U.S. PATENT DOCUMENTS

2013/0023155 A1* 1/2013 Il ........................ H01R 13/6593 439/607.27
2013/0288523 A1* 10/2013 Il ........................ H01R 13/6581 439/607.01
(Continued)

OTHER PUBLICATIONS

International Search Report issued on Mar. 2, 2021 for WO 2021/145194 A1 (4 pages).

*Primary Examiner* — Peter G Leigh
*Assistant Examiner* — Amara Anderson
(74) *Attorney, Agent, or Firm* — Venjuris, P.C.

(57) ABSTRACT

A shield connector is provided with a housing including a module accommodation chamber and a terminal module to be inserted into the module accommodation chamber from behind the housing. The terminal module is formed such that an inner conductor is surrounded by a dielectric and the dielectric is surrounded by an outer conductor. The outer conductor includes a projecting portion projecting from a position rearward of a front end of the outer conductor on an outer surface of the outer conductor. An inner wall surface constituting the module accommodation chamber has a
(Continued)

facing inner surface facing the outer surface formed with the projecting portion. The facing inner surface is formed with a projection-like backlash eliminating portion. The projecting portion is arranged behind the backlash eliminating portion with the terminal module inserted in the module accommodation chamber.

8 Claims, 6 Drawing Sheets

(51) Int. Cl.
*H01R 13/42* (2006.01)
*H01R 13/6582* (2011.01)
*H01R 13/6592* (2011.01)

(58) Field of Classification Search
USPC .................................................... 439/607.41
See application file for complete search history.

(56) References Cited

U.S. PATENT DOCUMENTS

| | | | |
|---|---|---|---|
| 2019/0006785 A1 | 1/2019 | Maesoba et al. | |
| 2019/0305444 A1 | 10/2019 | Hibino | |
| 2021/0151923 A1 | 5/2021 | Maesoba et al. | |
| 2023/0035192 A1* | 2/2023 | Matsuda | H01R 13/6272 |

* cited by examiner

SHIELD CONNECTOR INCLUDING PROJECTION-LIKE BACKLASH ELIMINATING PORTION

CROSS REFERENCE TO RELATED APPLICATIONS

This application is a national phase of PCT application No. PCT/JP2020/048631, filed on 25 Dec. 2020, which claims priority from Japanese patent application No. 2020-004084, filed on 15 Jan. 2020, all of which are incorporated herein by reference.

TECHNICAL FIELD

The present disclosure relates to a shield connector.

BACKGROUND

Patent Document 1 discloses a shield connector configured by inserting a terminal module connected to a shielded cable into an outer housing. The terminal module is configured by accommodating a female terminal into an inner housing and covering the inner housing by an outer shield shell.

PRIOR ART DOCUMENT

Patent Document

Patent Document 1: JP 2013-229255 A

SUMMARY OF THE INVENTION

Problems to be Solved

An outer shield shell used in a shield connector of this type can be composed of two components including a body member in the form of a rectangular tube for surrounding an inner housing and a connecting member to be crimped to a shield layer of a shielded cable. The body member and the connecting member can be united by crimping a fixing piece formed on a front end part of the connecting member to the outer periphery of the body member.

If the outer shield shell has a two-component structure, the fixing piece of the connecting member projects from the outer surface of the body member and a step is formed on the outer surface of the outer shield shell by the fixing piece. Thus, when a terminal module is inserted into a module accommodation chamber of an outer housing, a region of the terminal module forward of the fixing piece may rattle with the fixing piece as a fulcrum.

A shield connector of the present disclosure was completed on the basis of the above situation and aims to prevent the rattling of a terminal module in a housing.

Means to Solve the Problem

The present disclosure is directed to a shield connector with a housing including a module accommodation chamber, and a terminal module to be inserted into the module accommodation chamber from behind the housing, wherein the terminal module is formed such that an inner conductor is surrounded by a dielectric and the dielectric is surrounded by an outer conductor, the outer conductor includes a projecting portion projecting from a position rearward of a front end of the outer conductor on an outer surface of the outer conductor, an inner wall surface constituting the module accommodation chamber has a facing inner surface facing the outer surface formed with the projecting portion, the facing inner surface is formed with a projection-like backlash eliminating portion, and the projecting portion is arranged behind the backlash eliminating portion with the terminal module inserted in the module accommodation chamber.

Effect of the Invention

According to the present disclosure, it is possible to prevent the rattling of a terminal module in a housing.

DETAILED DESCRIPTION TO EXECUTE THE INVENTION

Description of Embodiments of Present Disclosure

Figure 1:
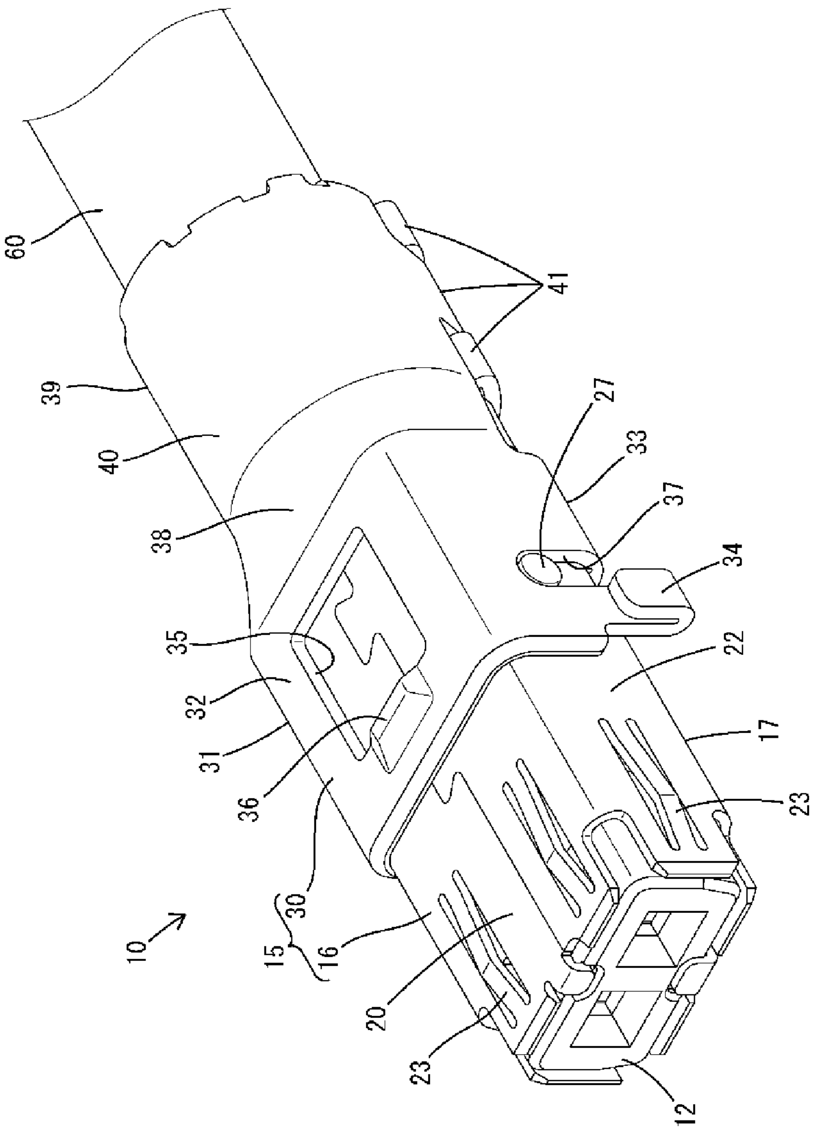
FIG. 1 is a perspective view of a terminal module viewed obliquely from above.

First, embodiments of the present disclosure are listed and described.

(1) A shield connector of the present disclosure is provided with a housing including a module accommodation chamber, and a terminal module to be inserted into the module accommodation chamber from behind the housing, wherein the terminal module is formed such that an inner conductor is surrounded by a dielectric and the dielectric is surrounded by an outer conductor, the outer conductor includes a projecting portion projecting from a position rearward of a front end of the outer conductor on an outer surface of the outer conductor, an inner wall surface constituting the module accommodation chamber has a facing inner surface facing the outer surface formed with the projecting portion, the facing inner surface is formed with a projection-like backlash eliminating portion, and the projecting portion is arranged behind the backlash eliminating portion with the terminal module inserted in the module accommodation chamber.

According to the configuration of the present disclosure, a gap due to the presence of the projecting portion is formed between a region forward of the projecting portion on the outer surface of the outer conductor and the facing inner surface of the module accommodation chamber with the terminal module inserted in the module accommodation chamber. However, since the projection-like backlash eliminating portion formed in the module accommodation chamber is present in this gap, the terminal module is not inclined with the projecting portion as a fulcrum. In this way, the rattling of the terminal module in the housing can be prevented.

(2) Preferably, a rear end part of the backlash eliminating portion is formed with a guiding surface inclined with respect to an inserting direction of the terminal module into the module accommodation chamber. According to this configuration, the front end of the terminal module can be prevented from butting against the backlash eliminating portion in an insertion process of the terminal module.

(3) Preferably, the backlash eliminating portion is shaped to become narrower in a projecting direction in a cross-section of the backlash eliminating portion cut perpendicular to the inserting direction of the terminal module. According to this configuration, sliding resistance between the terminal module and the backlash eliminating portion can be reduced in the insertion process of the terminal module while the strength of the backlash eliminating portion is ensured.

(4) Preferably, the module accommodation chamber is formed with a resiliently deformable locking lance for retaining the terminal module inserted into the module accommodation chamber, and the locking lance is located on a side opposite to the facing inner surface across the terminal module and capable of resiliently pressing the terminal module. According to this configuration, since the terminal module is held in contact with the backlash eliminating portion by a resilient pressing force of the locking lance, the rattling of the terminal module can be more effectively prevented.

(5) Preferably, a pair of the backlash eliminating portions are arranged in a symmetrical positional relationship while being spaced apart in a width direction of the terminal module. According to this configuration, the terminal module can be prevented from being inclined in the width direction by coming into contact with the pair of backlash eliminating portions.

(6) Preferably, the outer surface of the outer conductor is formed with a resilient contact portion configured to resiliently contact a mating member to be connected to the outer conductor, and the backlash eliminating portion is arranged at a position different from the resilient contact portion in the width direction of the terminal module. According to this configuration, the resilient contact portion does not interfere with the backlash eliminating portion in the process of inserting the terminal module into the module accommodation chamber. Therefore, an increase in insertion resistance due to the resilient deformation of the resilient contact portion caused by interference with the backlash eliminating portion can be avoided.

(7) Preferably, the outer conductor is configured by uniting a body member for surrounding the dielectric and a connecting member including a crimping portion to be connected to a shield layer of a shielded cable, and the projecting portion is formed by laying a fixing piece formed on the connecting member on an outer surface of the body member. According to this configuration, the simplification of the shape of each member, the simplification of a forming step of each member and the like can be realized by dividing the outer conductor into two components including the body member and the connecting member.

(8) In (7), preferably, the body member includes a rectangular tube portion for surrounding the dielectric and a first covering portion extending rearward from the rectangular tube portion, the connecting member includes a second covering portion coupling the fixing piece and the crimping portion, a tubular shield portion is constituted by the first covering portion and the second covering portion with the body member and the connecting member united, and the tubular shield portion surrounds a region of an internal conductor of the shielded cable between the shield layer and the rectangular tube portion. According to this configuration, the leakage of electromagnetic noise between the shield layer and the rectangular tube portion can be prevented.

Details of Embodiment of Present Disclosure

Embodiment

Figure 4:
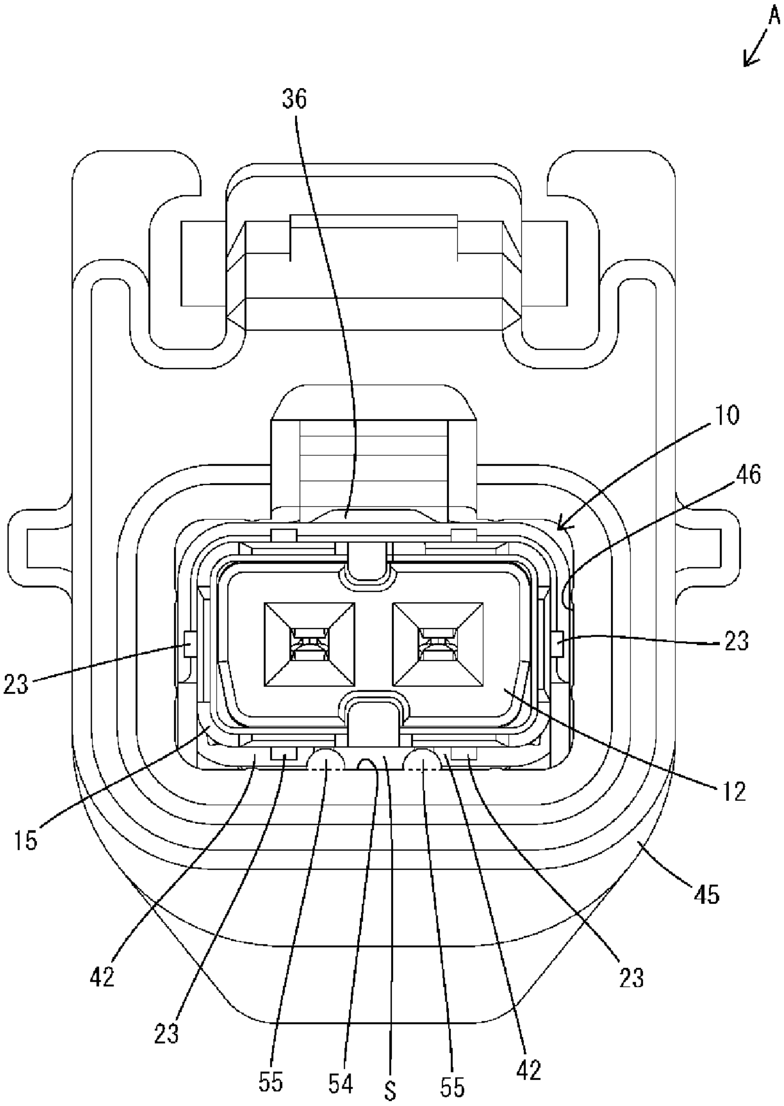
FIG. 4 is a front view of the shield connector.
Figure 5:
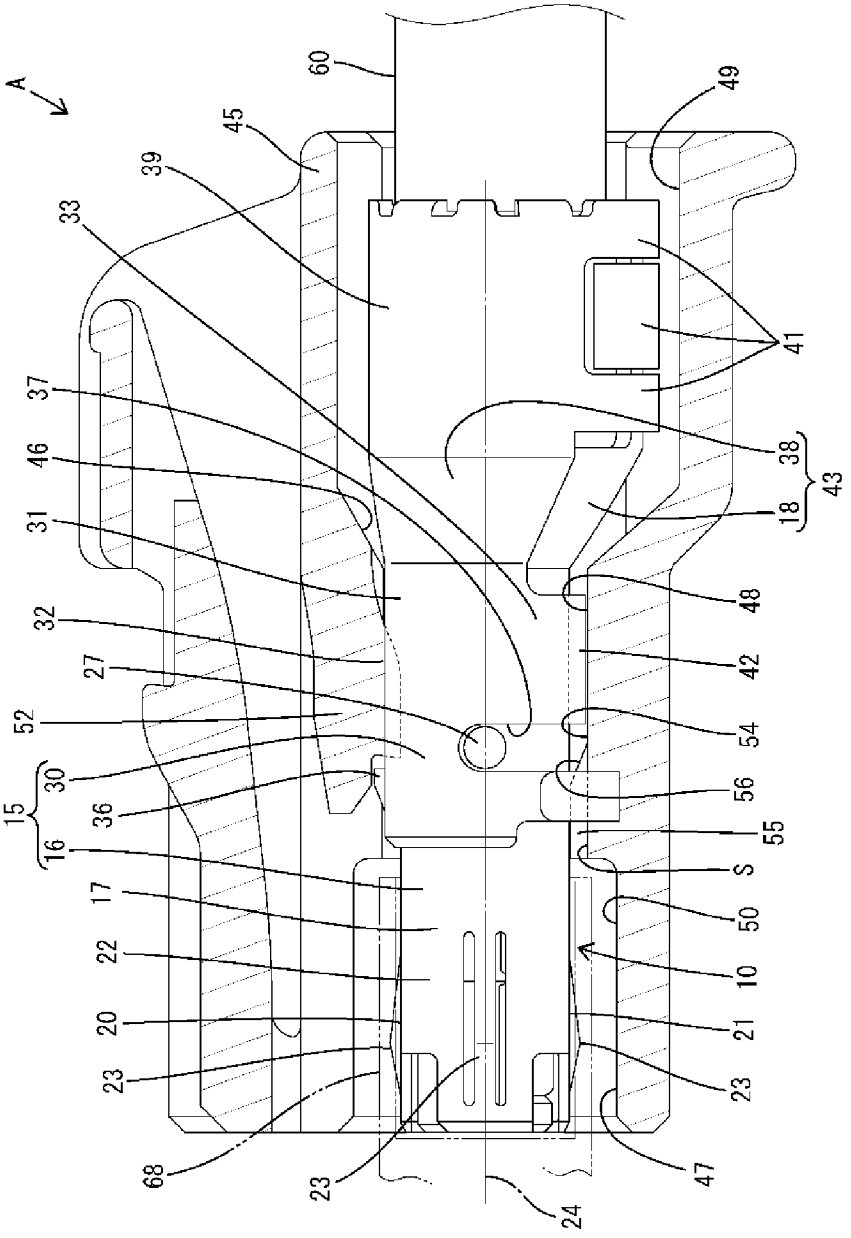
FIG. 5 is a side view partly in section of the shield connector.
Figure 6:
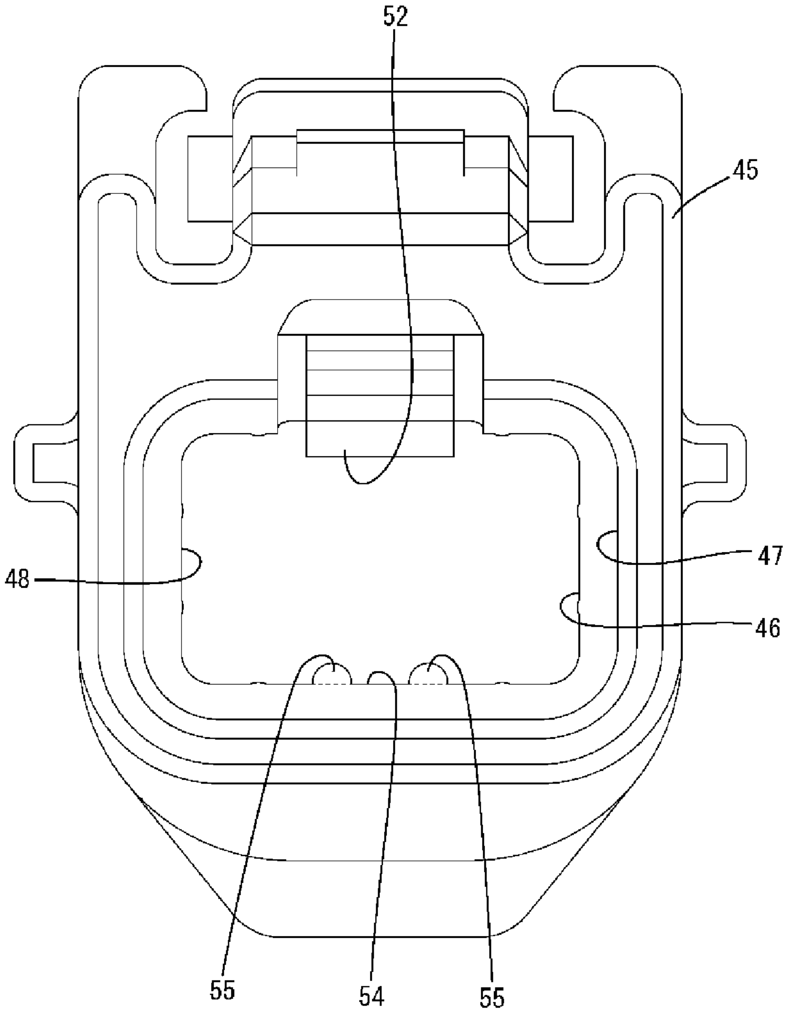
FIG. 6 is a front view of a housing.

A specific embodiment of a shield connector A of the present disclosure is described below with reference to FIGS. 1 to 6. Note that the present invention is not limited to these illustrations and is intended to be represented by claims and include all changes in the scope of claims and in the meaning and scope of equivalents. In this embodiment, an obliquely leftward direction in FIGS. 1 to 3 and a leftward direction in FIG. 5 are defined as a forward direction concerning a front-rear direction. Upper and lower sides shown in FIGS. 1 to 6 are directly defined as upper and lower sides concerning a vertical direction. Left and right sides shown in FIGS. 4 and 6 are directly defined as left and right sides concerning a lateral direction.

Figure 3:
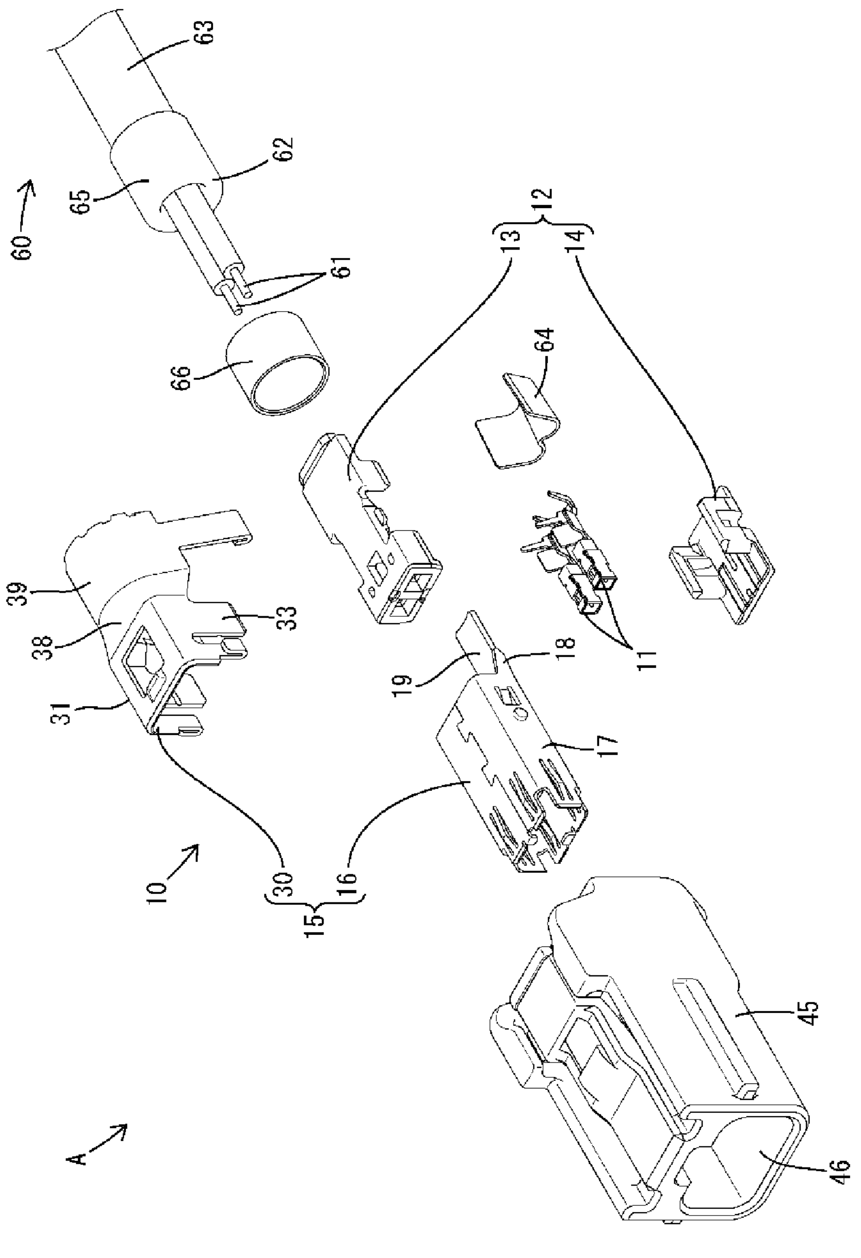
FIG. 3 is an exploded perspective view of a shield connector.

As shown in FIG. 3, the shield connector A includes a terminal module 10 connected to a front end part of a shielded cable 60 and a housing 45. The shielded cable 60 is configured such that a pair of internal conductors 61 each surrounded by an insulation coating are collectively surrounded by a shield shell 62 formed of a braided wire and the shield shell 62 is surrounded by a sheath 63. Front end parts of the pair of internal conductors 61 are positioned by a clip 64. A front end part of the shield shell 62 is folded rearward and serves as a folded portion 65 laid on the outer periphery of the sheath 63. A hollow cylindrical sleeve 66 is mounted as a reinforcing member between the outer periphery of the sheath 63 and the folded portion 65 of the shield shell 62.

The terminal module 10 includes a pair of left and right inner conductors 11, a dielectric 12 for accommodating the pair of inner conductors 11 and an outer conductor 15 for surrounding the inner conductors 11 and the dielectric 12. Rear end parts of the pair of inner conductors 11 are connected to the pair of internal conductors 61. The dielectric 12 is configured by uniting an accommodating member 13 and a cover member 14 and has a rectangular parallelepiped shape as a whole. The pair of inner conductors 11 are accommodated in the dielectric 12 while being sandwiched between the accommodating member 13 and the cover member 14.

Figure 2:
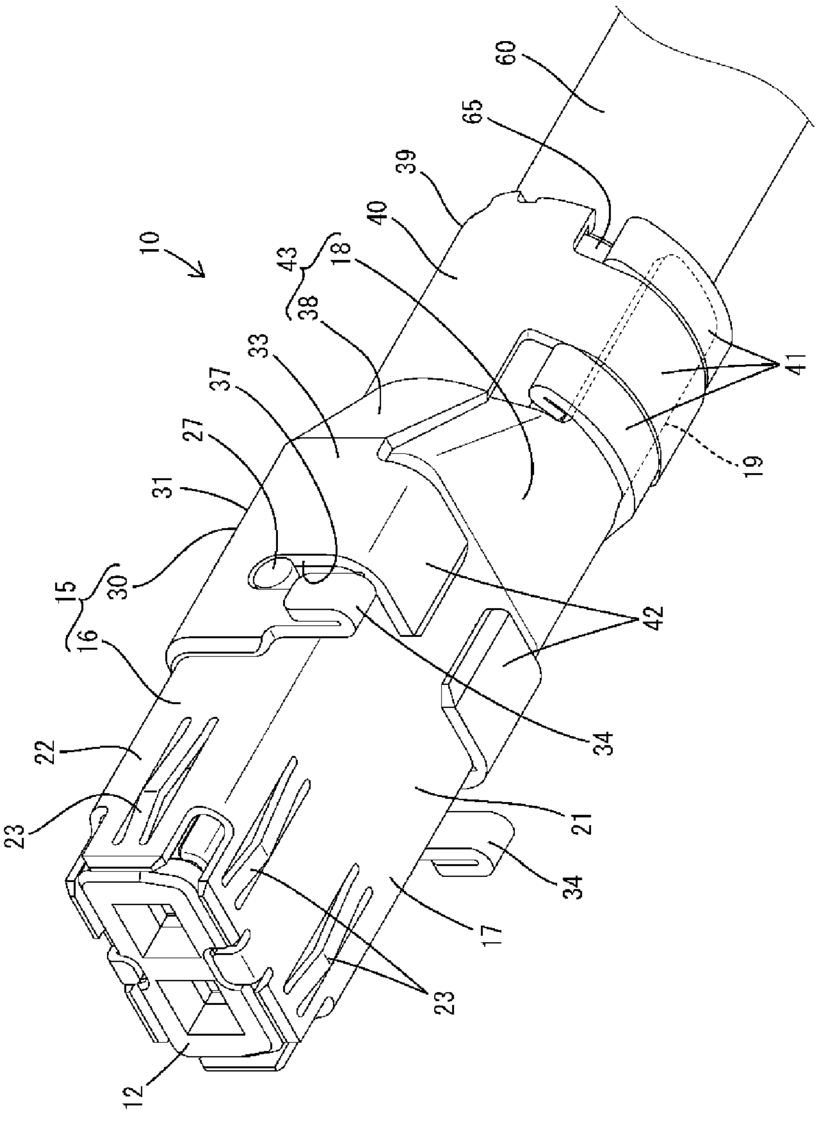
FIG. 2 is a perspective view of the terminal module viewed obliquely from below.

The outer conductor 15 is configured by assembling a body member 16 made of metal and a connecting member 30 made of metal and separate from the body member 16. The body member 16 is formed by bending and striking a metal plate material having a predetermined shape through press working. As shown in FIG. 2, the body member 16 includes a rectangular tube portion 17, a first covering portion 18 projecting rearward from the rear end of the rectangular tube portion 17 and a locking portion 19 extending rearward from the rear end of the first covering portion 18.

As shown in FIGS. 1 and 2, the rectangular tube portion 17 includes an upper plate portion 20, a lower plate portion 21 and a pair of left and right side plate portions 22. Both left and right side edges of the upper plate portion 20 and the upper end edges of the pair of side plate portions 22 are connected at a right angle, thereby forming corner ridges extending in the front-rear direction. Both left and right side edges of the lower plate portion 21 and the lower end edges of the pair of side plate portions 22 are also connected at a right angle, thereby forming corner ridges extending in the front-rear direction. The locking portion 19 is cantilevered rearward from a widthwise central part of the rear end edge of the lower plate portion 21.

Out of the rectangular tube portion 17, each of the upper plate portion 20 and the lower plate portion 21 is formed with a pair of bilaterally symmetrical resilient contact portions 23. The pair of resilient contact portions 23 are arranged while being spaced apart in width directions (lateral direction) of the upper plate portion 20 and the lower plate portion 21. One resilient contact portion 23 is formed at a vertical center position of each of the both left and right side plate portions 22. The resilient contact portions 23 project outward from the outer surfaces of the respective plate portions 20, 21 and 22. Six resilient contact portions 23 are arranged only in a region forward of a center in the front-rear direction of the rectangular tube portion 17.

The resilient contact portion 23 has a shape elongated in the front-rear direction in parallel to an axis 24 (see FIG. 5) of the outer conductor 15 as a whole. Both front and rear ends (in a longitudinal direction) of the resilient contact portions 23 are connected to the respective plate portions 20, 21 and 22 (forming bases). When being viewed from a direction parallel to the outer surface of each plate portion 20, 21, 22 and orthogonal to a length direction of the resilient contact portion 23, the resilient contact portion 23 has a chevron shape. A bent part corresponding to a top part of the chevron shape of the resilient contact portion 23 serves as a contact point portion to be brought into contact with the inner peripheral surface of a mating outer conductor 68 (see FIG. 5) in the form of a rectangular tube.

The both left and right side plate portions 22 constituting the rectangular tube portion 17 are formed with a pair of bilaterally symmetrical positioning protrusions 27. The pair of positioning protrusions 27 are disposed at positions rearward of the center in the front-rear direction of the rectangular tube portion 17. The first covering portion 18 is connected to the entire width region of the rear end edge of the lower plate portion 21 and lower end regions of the rear end edges of the both left and right side plate portions 22, and has a curved shape concave on an upper surface side. The locking portion 19 extends straight rearward in parallel to the axis 24 of the outer conductor 15 from a laterally central part of the rear end edge of the first covering portion 18.

As shown in FIGS. 1 and 2, the connecting member 30 includes a box-shaped coupling portion 31 having an open lower surface, a second covering portion 38 and a crimping portion 39 in the form of an open barrel. The coupling portion 31 includes a base plate portion 32 in the form of a flat plate, a pair of bilaterally symmetrical fixing pieces 33 extending downward from both left and right side edges of the base plate portion 32 and a pair of bilaterally symmetrical stabilizers 34 extending downward at a right angle from the both left and right side edges of the base plate portion 32. The base plate portion 32 is formed with a rectangular locking hole 35. A locking projection 36 projecting outwardly of the base plate portion 32 is formed on a front edge part of the opening edge of the locking hole 35.

The fixing pieces 33 are connected to regions except front end parts, out of side edge parts of the base plate portion 32. In a state before the connecting member 30 is united with the body member 16, the fixing pieces 33 are in the form of flat plates perpendicular to the base plate portion 32. In a step of assembling the connecting member 30 with the body member 16, extending end parts of the fixing pieces 33 are bent in parallel to the base plate portion 32. The stabilizers 34 are connected to front end parts of the side edge parts of the base plate portion 32. Positioning grooves 37 are formed between the rear end edges of the stabilizers 34 and the front end edges of the fixing pieces 33.

The second covering portion 38 is connected to the entire width region of the rear end edge of the base plate portion 32 and upper end regions of the rear end edges of the both left and right fixing pieces 33. The second covering portion 38 has a curved shape concave on a lower surface side (side facing the first covering portion 18), contrary to the first covering portion 18. The crimping portion 39 includes a base portion 40 connected to the rear end edge of the second covering portion 38 and crimping pieces 41 cantilevered from both left and right side edges of the base portion 40.

In uniting the body member 16 and the connecting member 30, the positioning protrusions 27 and the positioning grooves 37 are fit, the coupling portion 31 is put on a rear end part of the rectangular tube portion 17, the base plate portion 32 is laid on the outer surface of the upper plate portion 20, and the both left and right fixing pieces 33 are laid on the outer surfaces of the both left and right side plate portions 22. By fitting the positioning protrusions 27 and the positioning grooves 37, the body member 16 and the connecting member 30 are positioned in the front-rear direction. Since the coupling portion 31 is assembled behind the resilient contact portions 23, the base plate portion 32 and the stabilizers 34 do not interfere with the resilient contact portions 23.

Subsequently, lower end parts of the both fixing pieces 33 are bent and laid on the outer surface of the lower plate portion 21. As shown in FIGS. 2 and 5, the lower end parts of the fixing pieces 33 laid on the outer surface of the lower plate portion 21 project as a pair of bilaterally symmetrical projecting portions 42 from the outer surface of the rectangular tube portion 17 in a step-like manner. The projecting portions 42 are located on a rear end part of the rectangular tube portion 17 and arranged rearward of the resilient contact portions 23. In the above way, the body member 16 and the connecting member 30 are united and integrated, thereby constituting the outer conductor 15. Out of the connecting member 16, a front end part of the rectangular tube portion 17 where the resilient contact portions 23 are formed projects forward from the front end of the coupling portion 31 of the connecting member 30. A tubular shield portion 43 is constituted by the first covering portion 18 and the second covering portion 38 behind the rectangular tube portion 17.

The dielectric 12 is passed through the both covering portions 18, 38 and accommodated into the rectangular tube portion 17 from behind the outer conductor 15. The inner conductors 11 connected to the internal conductors 61 are accommodated in the dielectric 12. After the dielectric 12 is inserted into the rectangular tube portion 17, the base portion 40 of the crimping portion 39 and the locking portion 19 are laid on the outer periphery of the shield layer 62 to radially sandwich the shield layer 62 and the crimping pieces 41 are crimped to the outer peripheries of the locking portion 19 and the folded portion 65. The extending end parts of the crimping pieces 41 are locked to the locking portion 19 in a circumferential direction. If the crimping portion 39 is conductively crimped to the front end part of the shield layer 62, the terminal module 10 is connected to the front end part of the shielded cable 60.

With the terminal module 10 and the shielded cable 60 connected, the entire inner conductors 11 are shielded by being surrounded by the rectangular tube portion 17 of the outer conductor 15. Regions of the inner conductors 61 between the front end of the shield layer 62 and the rear end of the rectangular tube portion 17 are shielded by being surrounded by the tubular shield portion 43. Since being continuous over the entire circumference by having the four plate portions 20, 21 and 22, the rectangular tube portion 17 exhibits a high shielding performance Since both left and right end parts of the first covering portion 18 and both left and right end parts of the second covering portion 38 are in contact without any gap, the tubular shield portion 43 also exhibits a high shielding performance Therefore, electromagnetic noise generated in a conductive path composed of the internal conductors 61 and the inner conductors 11 does not leak to the outside of the outer conductor 15 between the front end of the shield layer 62 to the front end of the outer conductor 15.

The housing 45 is a single component made of synthetic resin. As shown in FIG. 5, a module accommodation chamber 46 penetrating through the housing 45 in the front-rear direction is formed inside the housing 45. The terminal module 10 is inserted into the module accommodation chamber 46 from behind the housing 45. The module accommodation chamber 46 includes a connection space 47 open in the front surface of the housing 45 and having a rectangular cross-section, a locking space 48 connected behind the connection space 47 and having a rectangular cross-section and a rear space 49 connected to the rear end of the locking space 48 and open in the rear end surface of the housing 45.

With the terminal module 10 inserted in the module accommodation chamber 46, a part of the outer conductor 15 forward of the front end of the connecting member 30, i.e. a part where the rectangular tube portion 17 is exposed, is accommodated in the connection space 47. A fitting space for accommodating the mating outer conductor 68 is present between the outer peripheral surface of the rectangular tube portion 17 and the inner peripheral surface of the connection space 47. The tubular shield portion 43 and the crimping portion 39 of the outer conductor 15 are accommodated into the rear space 49. The coupling portion 31 of the connecting member 30 is accommodated into the locking space 48.

The locking space 48 is defined by an upper wall surface, a lower wall surface and a pair of left and right side wall surfaces. A locking lance 52 cantilevered forward is formed on the upper wall surface. The locking lance 52 can be resiliently deformed in the vertical direction. With the terminal module 10 inserted in the module accommodation chamber 46, the upper surface of the base portion 40 of the coupling portion 31 is proximately facing the upper wall surface of the locking space 48 and the locking lance 52 is locked to the locking hole 35 and the locking projection 36 from behind. By the locking of the locking lance 52, the terminal module 10 is retained and held in the housing 45.

With the terminal module 10 inserted in the module accommodation chamber 46, the lower surfaces of the projecting portions 42 laid on the lower surface of the rectangular tube portion 17 are placed on the lower wall surface of the locking space 48. As shown in FIGS. 4 and 5, a region of the lower surface of the rectangular tube portion 17 forward of the projecting portions 42 is facing the lower wall surface across a gap S of a dimension equal to a projecting dimension of the projecting portions 42. The lower wall surface of the locking space 48 is a surface facing the lower surface of the rectangular tube portion 17 where the projecting portions 42 are arranged, out of the outer surface of the outer conductor 15, and defined as a facing inner surface 54 in this embodiment.

Since the gap S is present between the facing inner surface 54 and the lower surface of the outer conductor 15 in a region of the facing inner surface 54 forward of the projecting portions 42, there is a concern that the terminal module 10 rattles like a seesaw in the module accommodation chamber 46 with the front ends of the projecting portions 42 as a fulcrum. As a countermeasure against that, a pair of left and right backlash eliminating portions 55 are formed on the facing inner surface 54. The backlash eliminating portions 55 are elongated in the front-rear direction and in the form of ribs projecting from the facing inner surface 54. The backlash eliminating portions 55 are arranged on a front end part of the facing inner surface 54 and located to face the lower surface of the rectangular tube portion 17 forward of the projecting portions 42. By the contact of the upper ends of the backlash eliminating portions 55 with the lower surface of the rectangular tube portion 17, the terminal module 10 is suppressed or prevented from rattling like a seesaw.

As shown in FIGS. 4 and 6, the backlash eliminating portion 55 has a semicircular shape in a front view of the housing 45. That is, a width of the backlash eliminating portion 55 is largest at a lower end connected to the facing inner surface 54 and gradually decreases in a projecting direction (toward an upper side). The pair of backlash eliminating portions 55 are bilaterally symmetrically arranged in the width directions of the module accommodation chamber 46 and the terminal module 10.

As shown in FIG. 4, the pair of backlash eliminating portions 55 are arranged at positions different from the pair of resilient contact portions 23 formed in the lower plate portion 21 of the terminal module 10 in a front view. That is, the pair of backlash eliminating portions 55 are arranged between the pair of resilient contact portions 23. In the process of inserting the terminal module 10 into the module accommodation chamber 46, the resilient contact portions 23 pass laterally to the backlash eliminating portions 55 without interfering with the backlash eliminating portions 55 and reach predetermined positions (connection space 47) forward of the backlash eliminating portions 55.

As shown in FIG. 6, the pair of backlash eliminating portions 55 are located to face the locking lance 52 in a resilient deforming direction of the locking lance 52 (vertical direction). In other words, the locking lance 52 and the pair of backlash eliminating portions 55 are in such a positional relationship as to vertically sandwich the terminal module 10. In the lateral direction, the pair of backlash eliminating portions 55 are formed in a formation range of the locking lance 52. The terminal module 10 inserted into the module accommodation chamber 46 is resiliently pressed downward (toward the facing inner surface 54) by the locking lance 52. By this pressing action, the lower surface of the rectangular tube portion 17 is held in contact with the upper ends of the pair of backlash eliminating portions 55.

The shield connector A of this embodiment is provided with the housing 45 including the module accommodation chamber 46 and the terminal module 10 to be inserted into the module accommodation chamber 46 from behind the housing 45. In the terminal module 10, the inner conductors 11 are surrounded by the dielectric 12 and the dielectric 12 is surrounded by the outer conductor 15. The outer conductor 15 includes the projecting portions 42 projecting from the positions rearward of the front end of the outer conductor 15 on the outer surface of the outer conductor 15. The inner wall surface constituting the module accommodation chamber 46 has the facing inner surface 54. The facing inner surface 54 is facing the outer surface of the outer conductor 15 (lower surface of the rectangular tube portion 17) on which the projecting portions 42 are formed. The facing inner surface 54 is formed with the projection-like backlash eliminating portions 55. With the terminal module 10 inserted in the module accommodation chamber 46, the projecting portions 42 are arranged behind the backlash eliminating portions 55.

With the terminal module 10 inserted in the module accommodation chamber 46, the gap S due to the presence of the projecting portions 42 is formed between the region forward of the projecting portions 42, out of the outer surface of the outer conductor 15, and the facing inner surface 54 of the module accommodation chamber 46. However, since the projection-like backlash eliminating portions 55 formed in the module accommodation chamber 46 are present in this gap S, the terminal module 10 is not inclined with the projecting portions 42 as a fulcrum. In this way, the rattling of the terminal module 10 in the housing 45 can be prevented.

Guiding surfaces 56 inclined with respect to an inserting direction of the terminal module 10 into the module accommodation chamber 46 are formed on rear end parts of the backlash eliminating portions 55. In the insertion process of the terminal module 10, the front end of the terminal module 10 slides in contact with the guiding surfaces 56 without butting against the backlash eliminating portions 55. In this way, the terminal module 10 can be inserted into the module accommodation chamber 46 without any problem. The pair of backlash eliminating portions 55 are arranged in a bilaterally symmetrical positional relationship while being spaced apart in the width direction of the terminal module 10. The inclination of the terminal module 10 in the width direction can be prevented by the contact of the terminal module 10 with the pair of backlash eliminating portions 55.

In a cross-section of the backlash eliminating portion 55 cut perpendicular to the inserting direction of the terminal module 10, the backlash eliminating portion 55 has a semicircular shape narrowed in the projecting direction from the facing inner surface 54. By forming the backlash eliminating portion 55 into a semicircular cross-sectional shape, sliding resistance between the terminal module 10 and the backlash eliminating portion 55 can be reduced in the insertion process of the terminal module 10 while the strength of the backlash eliminating portion 55 is ensured.

The module accommodation chamber 46 is formed with the resiliently deformable locking lance 52 for retaining the terminal module 10 inserted into the module accommodation chamber 46. The locking lance 52 is arranged at a position opposite to the facing inner surface 54 across the terminal module 10 and can resiliently press the terminal module 10. Since the terminal module 10 is held in contact with the backlash eliminating portions 55 by a resilient pressing force of the locking lance 52, the rattling of the terminal module 10 can be more effectively prevented.

The outer surface of the outer conductor 15 is formed with the resilient contact portions 23 configured to resiliently contact the mating member (mating outer conductor 68) to be connected to the outer conductor 15. The backlash eliminating portions 55 are arranged at the positions different from the resilient contact portions 23 in the width direction of the terminal module 10. Thus, in the process of inserting the terminal module 10 into the module accommodation chamber 46, the resilient contact portions 23 do not interfere with the backlash eliminating portions 55. In this way, an increase in insertion resistance due to the resilient deformation of the resilient contact portions 23 caused by interference with the backlash eliminating portions 55 can be avoided.

The outer conductor 15 is configured by uniting the body member 16 for surrounding the dielectric 12 and the connecting member 30 including the crimping portion 39 to be connected to the shield layer 62 of the shielded cable 60. The fixing pieces 33 formed on the connecting member 30 are bent and laid on the outer surface of the body member 16, whereby the projecting portions 42 are formed. According to this configuration, the simplification of the shape of each member 16, 30, the simplification of a forming step of each member 16, 30 and the like can be realized by dividing the outer conductor 15 into two components including the body member 16 and the connecting member 30.

The body member 16 includes the rectangular tube portion 17 for surrounding the dielectric 12 and the first covering portion 18 extending rearward from the rectangular tube portion 17. The connecting member 30 includes the second covering portion 38 coupling the fixing pieces 33 and the crimping portion 39. With the body member 16 and the connecting member 30 united, the tubular shield portion 43 is constituted by the first and second covering portions 18, 38. The tubular shield portion 43 surrounds the regions of the internal conductors 61 of the shielded cable 60 between the shield layer 62 and the rectangular tube portion 17. According to this configuration, the leakage of electromagnetic noise between the shield layer 62 and the rectangular tube portion 17 can be prevented.

Other Embodiments

The present invention is not limited to the above described and illustrated embodiment and is represented by claims. The present invention is intended to include all changes in the scope of claims and in the meaning and scope of equivalents and include also the following embodiments.

Although the backlash eliminating portion has a semicircular cross-sectional shape in the above embodiment, the backlash eliminating portion may have a trapezoidal cross-sectional shape.

Although the cross-sectional shape of the backlash eliminating portion is narrowed in the projecting direction in the above embodiment, the cross-sectional shape of the backlash eliminating portion may have a constant width from a base end to a projecting end.

Although the locking lance presses the terminal module against the backlash eliminating portions in the above embodiment, the locking lance may not press the terminal module against the backlash eliminating portions.

Although the pair of backlash eliminating portions are arranged in a symmetrical positional relationship while being spaced apart in the width direction of the terminal module in the above embodiment, the pair of backlash eliminating portions may be arranged in an asymmetrical positional relationship in the width direction.

Although the pair of backlash eliminating portions are provided in the above embodiment, the number of the backlash eliminating portions may be one, three or more.

Although the backlash eliminating portions are arranged at the positions different from the resilient contact portions in the width direction of the terminal module in the above embodiment, the backlash eliminating portions may be arranged at positions interfering with the resilient contact portions in the width direction of the terminal module.

Although the outer conductor is composed of two components including the body member and the connecting member in the above embodiment, the outer conductor may be a single component.

LIST OF REFERENCE NUMERALS

A shield connector
S gap
10 terminal module
11 inner conductor
12 dielectric
13 accommodating member
14 cover member
15 outer conductor
16 body member
17 rectangular tube portion
18 first covering portion
19 locking portion
20 upper plate portion
21 lower plate portion
22 side plate portion
23 resilient contact portion
24 axis of outer conductor
27 positioning protrusion
30 connecting member
31 coupling portion
32 base plate portion
33 fixing piece
34 stabilizer
35 locking hole
36 locking projection
37 positioning groove
38 second covering portion
39 crimping portion
40 base portion
41 crimping piece
42 projecting portion
43 tubular shield portion
45 housing
46 module accommodation chamber
47 connection space
48 locking space
49 rear space
50 fitting space
52 locking lance
54 facing inner surface
55 backlash eliminating portion
56 guiding surface
60 shielded cable
61 internal conductor
62 shield layer
63 sheath
64 clip
65 folded portion
66 sleeve
68 mating outer conductor

What is claimed is:

1. A shield connector, comprising:

a housing including a module accommodation chamber; and a terminal module to be inserted into the module accommodation chamber from behind the housing, wherein:

the terminal module is formed such that an inner conductor is surrounded by a dielectric and the dielectric is surrounded by an outer conductor, the outer conductor includes a projecting portion projecting from a position rearward of a front end of the outer conductor on an outer surface of the outer conductor, an inner wall surface constituting the module accommodation chamber has a facing inner surface facing the outer surface formed with the projecting portion, the facing inner surface is formed with a projection-like backlash eliminating portion, and the projecting portion is arranged behind the backlash eliminating portion with the terminal module inserted in the module accommodation chamber.

2. The shield connector according to claim 1, wherein a rear end part of the backlash eliminating portion is formed with a guiding surface inclined with respect to an inserting direction of the terminal module into the module accommodation chamber.

3. The shield connector according to claim 1, wherein the backlash eliminating portion is shaped to become narrower in a projecting direction in a cross-section of the backlash eliminating portion cut perpendicular to an inserting direction of the terminal module.

4. The shield connector according to claim 1, wherein:

the module accommodation chamber is formed with a resiliently deformable locking lance for retaining the terminal module inserted into the module accommodation chamber, and the locking lance is located on a side opposite to the facing inner surface across the terminal module and capable of resiliently pressing the terminal module.

5. The shield connector according to claim 1, wherein a pair of the backlash eliminating portions are arranged in a symmetrical positional relationship while being spaced apart in a width direction of the terminal module.

6. The shield connector according to claim 1, wherein:

the outer surface of the outer conductor is formed with a resilient contact portion configured to resiliently contact a mating member to be connected to the outer conductor, and the backlash eliminating portion is arranged at a position different from the resilient contact portion in a width direction of the terminal module.

7. The shield connector according to claim 1, wherein:

the outer conductor is configured by uniting a body member for surrounding the dielectric and a connecting member including a crimping portion to be connected to a shield layer of a shielded cable, and the projecting portion is formed by laying a fixing piece formed on the connecting member on an outer surface of the body member.

8. The shield connector according to claim 7, wherein:

the body member includes a rectangular tube portion for surrounding the dielectric and a first covering portion extending rearward from the rectangular tube portion, the connecting member includes a second covering portion coupling the fixing piece and the crimping portion, a tubular shield portion is constituted by the first covering portion and the second covering portion with the body member and the connecting member united, and the tubular shield portion surrounds a region of an internal conductor of the shielded cable between the shield layer and the rectangular tube portion.

* * * * *